Dec. 2, 1924.

D. H. SCOTT 1,517,589

AMUSEMENT APPARATUS

Filed Aug. 23, 1924      3 Sheets-Sheet 1

Inventor

D. H. Scott

By Fisher, McKee & Moore
Attorneys

Dec. 2, 1924. 1,517,589
D. H. SCOTT
AMUSEMENT APPARATUS
Filed Aug. 23, 1924   3 Sheets-Sheet 3

Inventor
D. H. Scott

Patented Dec. 2, 1924.

1,517,589

UNITED STATES PATENT OFFICE.

DUDLEY HUMPHREY SCOTT, OF CLEVELAND, OHIO, ASSIGNOR TO THE HUMPHREY COMPANY, OF CLEVELAND, OHIO, A CORPORATION OF OHIO.

AMUSEMENT APPARATUS.

Application filed August 23, 1924. Serial No. 733,803.

*To all whom it may concern:*

Be it known that I, DUDLEY HUMPHREY SCOTT, a citizen of the United States, residing at Cleveland, in the county of Cuyahoga and State of Ohio, have invented certain new and useful Improvements in an Amusement Apparatus, of which the following is a specification.

My invention relates to an improvement in an amusement device, and particularly an apparatus in which a wheeled vehicle is caused to travel upon a waving or undulating flexible floor or track, for example, such as shown and described in the Letters Patent of the United States to T. Van Kannel, No. 694,447, March 4, 1902.

In the operation of such apparatus it is a common experience to have one or more of the vehicles stall and blockade the progress of other vehicles on the track, and the frequent delays in travel and inability to move rapidly and continuously over the undulating floor damps the desire of the riders to repeat such rides and the apparatus accordingly loses its popularity and the owners suffer losses in its operations. My object is to provide a dirigible vehicle which may be instantly self-propelled at intervals when the stalling of the car occurs or is about to occur, and which may also be caused to travel and roll freely and at an accelerated speed by the wave movements of the floor without being impeded or retarded by the motor or driving connections on the vehicle.

Figure 1:
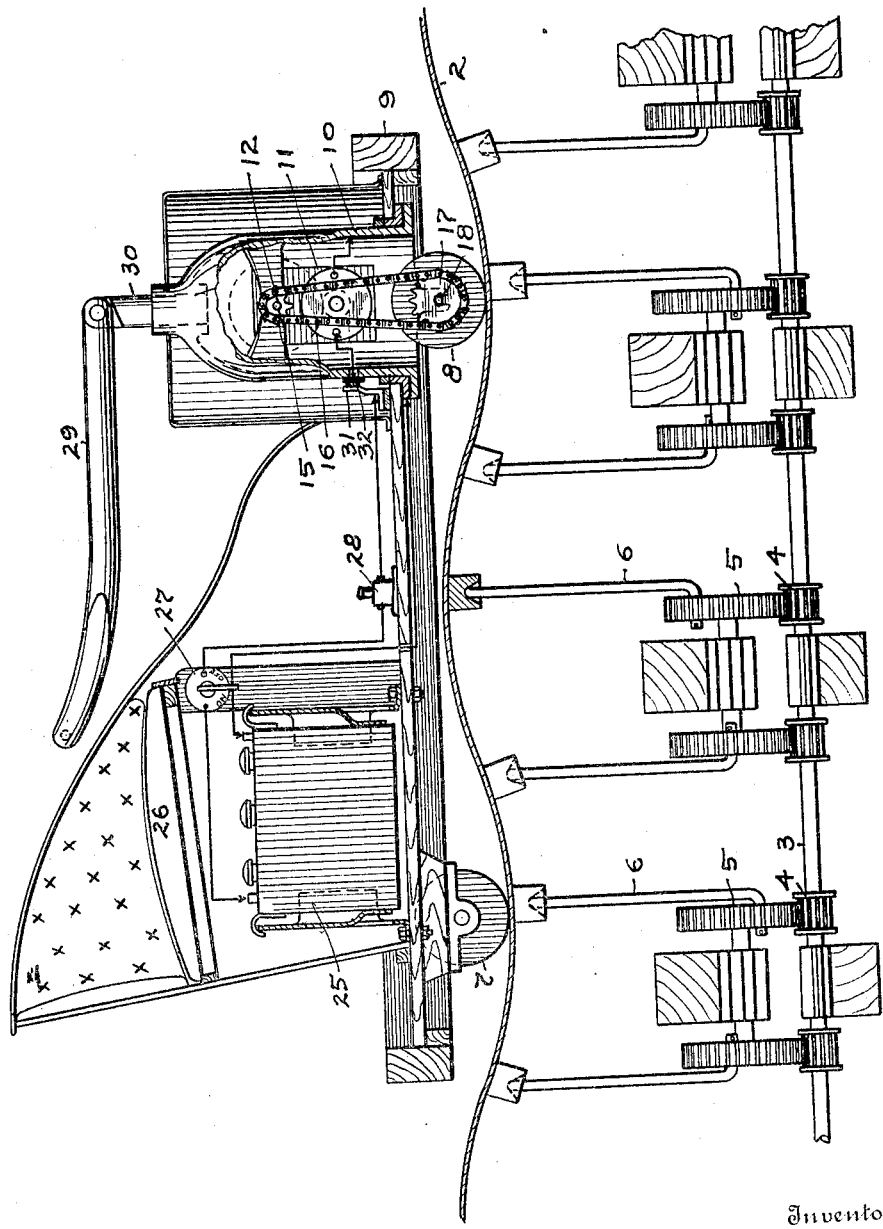
Figure 2:
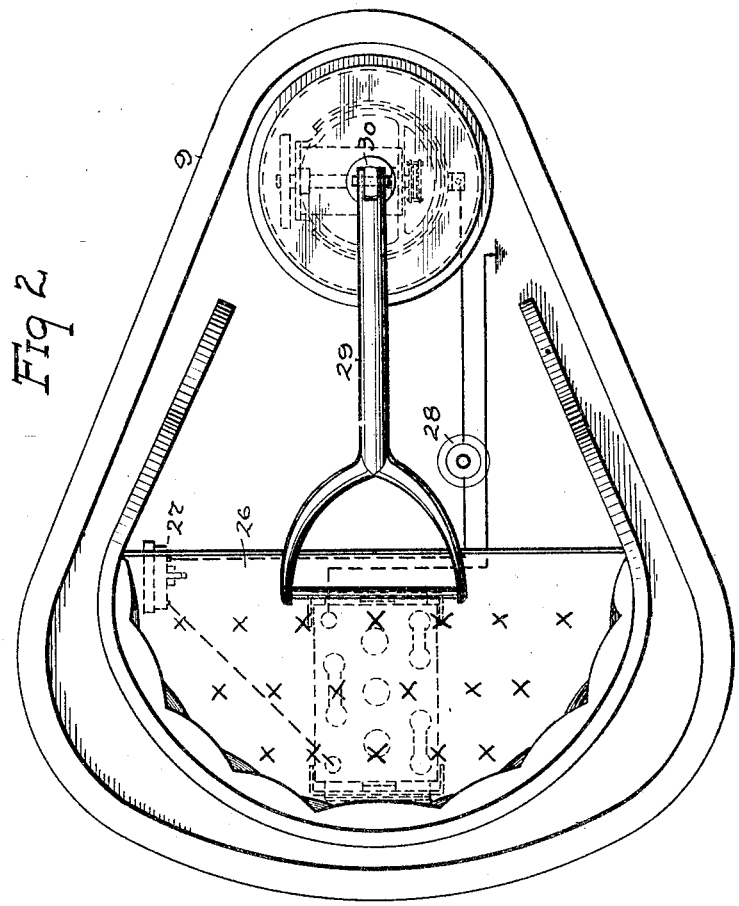
Figure 3:
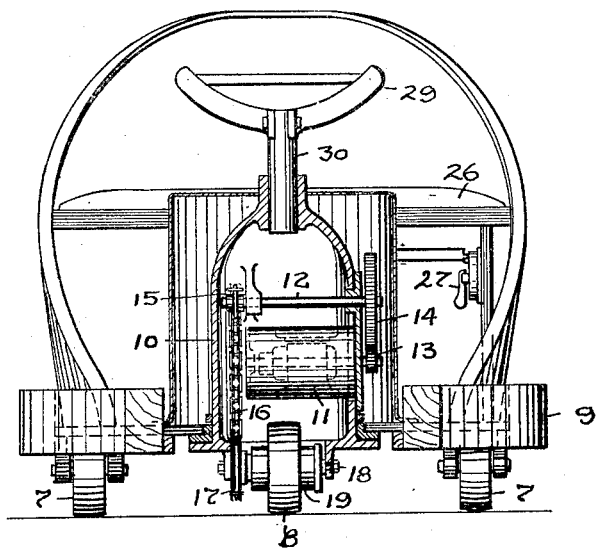
Figure 4:
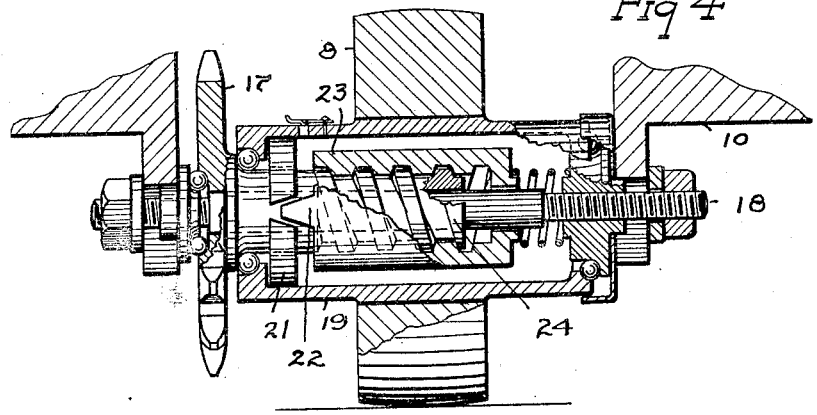

In the accompanying drawings, Fig. 1 is a sectional view of a flexible floor and undulating mechanism therefor and a sectional view of a dirigible vehicle embodying my invention. Fig. 2 is a top view of the vehicle, and Fig. 3 a vertical section transversely thereof on the center line of the steering and driving wheel. Fig. 4 is an enlarged sectional view of the steering and driving wheel.

In an amusement apparatus such as referred to herein a track or floor 2 made of sheet metal is adapted to be raised and lowered and also flexed progressively to simulate a wave movement, and a shaft 3 having a series of pinions 4 is generally employed to drive a set of gears 5 having crank connections 6 with the flexible floor to raise and lower the same and produce the desired wave movement. Heretofore the vehicles used and combined to operate with this type of undulating track or floor depended entirely upon the wave action of the floor to impart travel to the vehicle. In the present apparatus, I provide a vehicle having two small rear wheels or rollers 7—7 which are free to rotate on their axles or journals, and mount a single guiding and steering wheel 8 beneath the front end of the platform 9 of the vehicle. As shown steering wheel 8 is supported at the bottom of a revoluble housing 10 carrying a small electric motor 11 and a short counter shaft 12. A pinion 13 on the motor shaft meshes with a gear 14 on the countershaft, and a sprocket wheel 15 on the counter shaft is connected by an endless sprocket chain 16 with a sprocket wheel 17 supported on a fixed shaft 18 for steering wheel 8. A friction drive connection is utilized between sprocket wheel 17 and the hollow spindle 19 of wheel 8 to permit the power from the motor to be applied to the wheel when the vehicle is at rest or moving very slowly and to be disconnected automatically when the car is coasting over the floor at accelerated speeds.

Any suitable power transmitting device may be used to apply the power in that way to the steering wheel, such for example as the coaster brake mechanism used in motor cycles. Thus in Fig. 4 I show a split band or friction ring 21 seated within one end of hollow spindle 19. This band is adapted to be expanded to drive the spindle and wheel when power is applied to rotate sprocket 17, and its expansion is effected by a wedge-shaped projection 22 forming a part of a screw-threaded sleeve 23 engaged with the screw-threaded extension 24 of sprocket wheel 17. Rotation of sprocket wheel 17 in one direction will move sleeve 23 longitudinally and expand the friction ring so that wheel 8 will rotate under the power of the electric motor, but if the car is moving at a faster speed than that applied by the sprocket the wheel frees itself and the car coasts down the inclined sides of the waves. This coasting movement may be accelerated by steering the car diagonally to the course of the waves created in the floor and by applying the power in the way described to the steering wheel the operator of the car is enabled at all times to control the movement of the car by either the undulating movement of the floor or the motor, or by the floor and motor jointly.

A storage battery 25 is removably supported upon platform 9 beneath the operator's seat 26 and an electric hand-operated switch 27 or an electric foot-operated switch 28 may be used by the operator to control the electric current supply and operation of the motor. A pivoted steering handle 29 is connected to a vertical operating stem 30 at the top of the revoluble motor casing or housing 10, and a stationary spring contact member 31 may be used to conduct the electric current to a conducting band or segment 32 mounted upon one side of said housing. The other conductor may be grounded to the motor casing or housing.

What I claim as my invention, is:

1. An amusement apparatus, comprising a flexible floor and means adapted to impart an undulating movement thereto, in combination with a wheeled vehicle adapted to coast upon said floor having a power starting and propelling device adapted to be automatically disconnected when the movement of the vehicle is accelerated by the undulating movements of the floor.

2. An amusement apparatus, comprising a flexible floor and means adapted to impart an undulating movement thereto, in combination with a wheeled vehicle having a steering wheel and a motor adapted to rotate said wheel and means adapted to disconnect said motor when the vehicle is coasting over said floor at accelerated speed.

3. An amusement apparatus, comprising a vehicle adapted to coast upon an undulating floor, a steering wheel and a rotatable support therefor, an electric motor mounted upon said support in power-transmitting connection with said wheel, and means adapted to disconnect said motor automatically when said vehicle is coasting over said floor.

In testimony whereof I affix my signature.

DUDLEY HUMPHREY SCOTT.